UNITED STATES PATENT OFFICE.

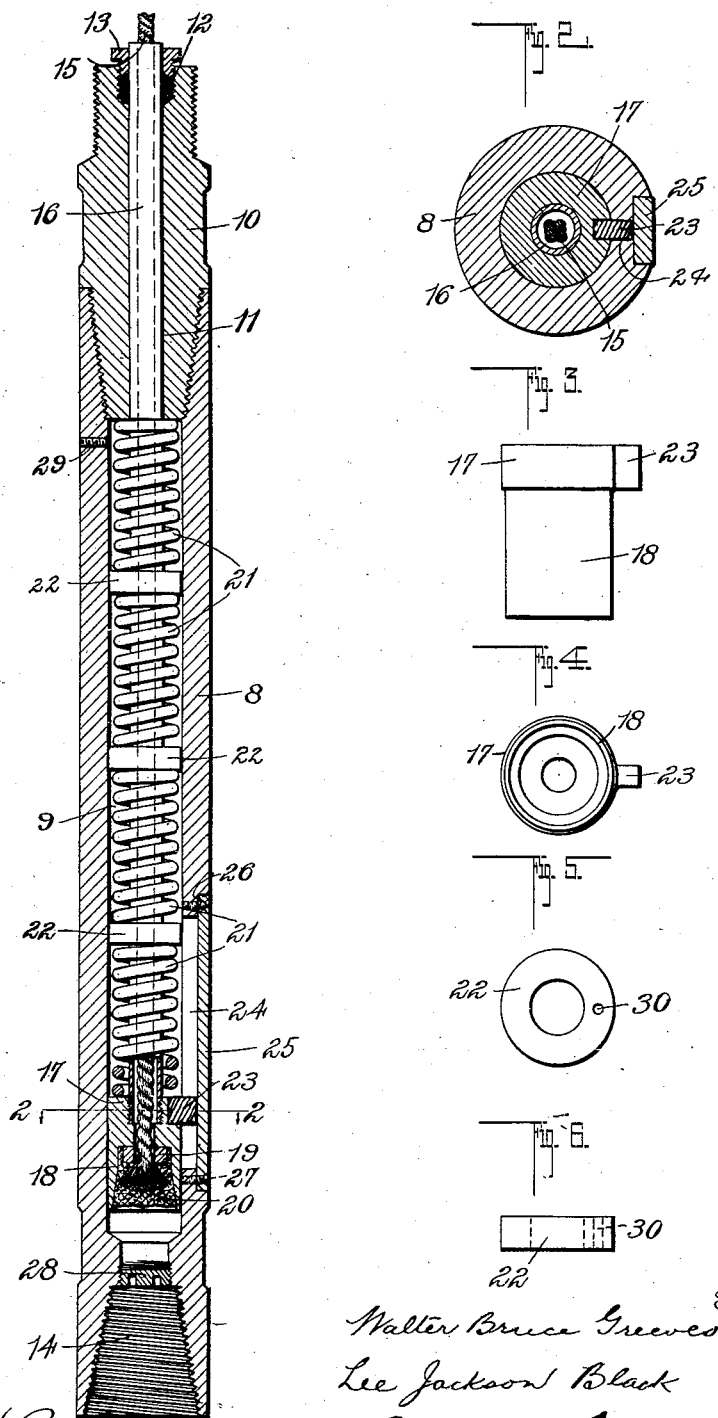

WALTER BRUCE GREEVES AND LEE JACKSON BLACK, OF BEAUMONT, TEXAS.

ROPE-SOCKET.

966,011.     Specification of Letters Patent.     Patented Aug. 2, 1910.

Application filed June 8, 1909. Serial No. 500,907.

*To all whom it may concern:*

Be it known that we, WALTER BRUCE GREEVES and LEE JACKSON BLACK, citizens of the United States, residing at Beaumont, in the county of Jefferson and State of Texas, have invented certain new and useful Improvements in Rope-Sockets, of which the following is a specification.

This invention relates to rope sockets of that kind used for fastening a rope or cable to a well-drilling tool, and its object is to provide a yielding connection to take up jars and shocks; and also to provide a socket in which the rope is not subjected to friction, and is kept on a straight run, thereby avoiding kinks.

With the above stated objects in view, the invention consists in the novel construction and arrangement of parts to be hereinafter described and claimed, reference being had to the drawing hereto annexed forming a part of this specification, in which drawing, Figure 1 is a longitudinal sectional view of the device. Fig. 2 is a cross section on the line 2—2 of Fig. 1. Fig. 3 is an elevation of the plunger hereinafter referred to, and Fig. 4 is an end view thereof. Fig. 5 is a plan view of one of the spacing washers, and Fig. 6 is an end view thereof.

Referring more particularly to the drawing, 8 denotes a coupling device known as a sub, the same having a longitudinal bore 9 which is closed at one end by a plug 10 screwed thereinto. This plug has a longitudinal bore 11 which is in alinement with the bore 9, and its outer end is provided with a stuffing box 12 closed by a gland 13. At the opposite end, the sub has a screw-threaded socket 14 by which connection with a tool or another sub is made.

At 15 is indicated the wire rope or cable which carries the sub 8. The end of this rope passes through a tube 16 extending through the bore 11 into the bore 9 of the sub. To the inner end of the tube 16 is rigidly connected a collar 17 which has a sliding fit in the bore 9. The collar is formed on one side with a socketed extension 18 in which seats a nut 19 through which the end of the rope is passed, and its strands spread on the outside thereof. The collar has a central opening into which the tube 16 screws, and this opening is continued through the collar, the end of the rope extending therethrough to the nut. The socket of the extension 18 is filled with Babbitt metal indicated at 20 in which the nut and the spread end of the rope are embedded, whereby the latter is securely made fast to the collar.

Between the collar 17 and the inner end of the plug 10, the bore 9 of the sub contains a series of springs 21 which are coiled around the tube 16, and spaced apart by washers 22 loosely fitting the tube, and having a working fit in the bore 9.

From the edge of the collar 17 projects a stud 23 which works in a longitudinal slot 24 made in the wall of the bore 9, and which serves to prevent rotation of the collar. The slot is closed by a cover plate 25 which seats in a rabbet 25 made in the walls of the slot so as to extend flush with the outer surface of the sub. The cover plate is secured by countersunk screws 27.

Into the inner end of the socket 14 is screwed a plug 28 for closing the adjacent end of the bore 9.

In the wall of the sub, adjacent to the plug 10, is a hole which communicates with the bore 9, and is closed by a screw plug 29. The bore 9 is adapted to be filled with oil through this hole upon removal of the plug. In order that the oil may flow between the washers 22, small openings 30 are made therein.

By the structure herein described all jars and shocks are taken up by the springs 21. The bore 9 will be filled with oil up to within a short distance of the top, so that in the event of the springs breaking, the oil will cushion the jar at the top, and will not let the collar 17 have a long drawn jar against the top. The oil also serves to keep the parts lubricated.

The tube 16 works up and down in the bore 11 and stuffing box 12, and there is no relative movement between the tube and the rope, and consequently there is no friction on the latter, and it is kept on a straight run, thereby preventing kinks. The stud 23 also enables the tool in the bottom of the drill hole to be rotated, by simply twisting the rope on top.

By providing a plurality of springs, they are less liable to be broken, and if one of them should break the cushioning effect is not destroyed.

From the foregoing it is thought that the construction, operation and advantages of the invention will be apparent to those skilled in the art without further description, and it will be understood that various changes in the size, shape, proportion, and minor details of construction may be resorted to without departing from the spirit or sacrificing any of the advantages of the invention.

We claim:

1. A rope socket comprising a coupling member having a longitudinal bore, a plunger working in said bore, cushioning means in the bore against which the plunger works, means for preventing rotary movement of the plunger in the bore, a tube connected to the plunger, and a line passing into the tube and fastened thereto.

2. A rope socket comprising a coupling member having a longitudinal bore, the wall of said bore having a longitudinal slot, a plunger working in said bore, and having a stud entering the slot thereof, cushioning means in the bore against which the plunger works, a tube connected to the plunger, and a line passing into the tube and fastened thereto.

3. A rope socket comprising a coupling member having a longitudinal bore, and a longitudinal slot, a plunger working in said bore, cushioning means in the bore against which the plunger works, a stud projecting from the plunger into the aforesaid slot to hold the plunger against turning movement in the bore, a line connected to the plunger, and a cover over the slot, said cover extending flush with the outer surface of the coupling member.

In testimony whereof we affix our signatures in presence of two witnesses.

WALTER BRUCE GREEVES.
LEE JACKSON BLACK.

Witnesses:
L. L. DONNELLY,
W. C. WINELAND.